(12) United States Patent
Thalberg

(10) Patent No.: US 8,944,029 B2
(45) Date of Patent: Feb. 3, 2015

(54) TURBOCHARGER FOR A COMBUSTION ENGINE WITH MAGNETS ARRANGED ALONG AN AIR INLET CHANNEL

(75) Inventor: Anders Thalberg, Hafslundsoy (NO)

(73) Assignee: Carbon Reduction Solutions AS, Gralum Sarpsborg (NO)

(*) Notice: Subject to any disclaimer, the term of this patent is extended or adjusted under 35 U.S.C. 154(b) by 251 days.

(21) Appl. No.: 13/258,178

(22) PCT Filed: Mar. 23, 2010

(86) PCT No.: PCT/NO2010/000110
§ 371 (c)(1),
(2), (4) Date: Nov. 2, 2011

(87) PCT Pub. No.: WO2010/110672
PCT Pub. Date: Sep. 30, 2010

(65) Prior Publication Data
US 2012/0039704 A1 Feb. 16, 2012

(30) Foreign Application Priority Data
Mar. 24, 2009 (NO) .................................. 20091230

(51) Int. Cl.
*F02M 37/00* (2006.01)
*F02M 27/00* (2006.01)
(Continued)

(52) U.S. Cl.
CPC .............. *F02M 27/045* (2013.01); *F02B 51/04* (2013.01); *Y02T 10/126* (2013.01)
USPC ............ 123/434; 123/537; 123/539; 123/536

(58) Field of Classification Search
USPC ..................... 60/608; 123/536, 537, 539, 434, 123/184.59, 184.61
See application file for complete search history.

(56) References Cited

U.S. PATENT DOCUMENTS 5,140,816 A * 8/1992 Scicluna ...................... 60/605.1
5,500,121 A * 3/1996 Thornton et al. ............. 210/222
(Continued)

FOREIGN PATENT DOCUMENTS

GB 2281351 A 3/1995
KR 1019920006633 4/1992
(Continued)

OTHER PUBLICATIONS

International Search Report, dated Jun. 16, 2010, from corresponding PCT application.
(Continued)

*Primary Examiner* — Thai Ba Trieu
*Assistant Examiner* — Deming Wan
(74) *Attorney, Agent, or Firm* — Young & Thompson

(57) ABSTRACT

A turbo charger driven by exhaust gas from a combustion engine via an exhaust inlet to the turbo charger,
the turbo charger having an axial inlet for combustion air generally at atmospheric pressure, from an outlet at a bent pipe portion with an inlet from an inlet channel from an air inlet,
the inlet channel having at least one arched wall of non-magnetic material, with an inward facing surface and an outward facing surface relative to the inlet channel,
wherein along the arched wall is arranged a series of at least three magnets having sequentially opposite magnetization directions directed mainly orthogonal to the wall, and with a pole surface of each magnet generally in level with the wall, and
with a mutual separation between the magnets being at least as long as a half of a first width of the inlet channel's cross-section.

18 Claims, 4 Drawing Sheets

(51) Int. Cl.
  *F02M 51/00* (2006.01)
  *F02M 27/04* (2006.01)
  *F02B 51/04* (2006.01)

(56) References Cited

U.S. PATENT DOCUMENTS

| | | | | |
|---|---|---|---|---|
| 6,021,764 | A | * | 2/2000 | Koyama .................. 123/563 |
| 6,178,954 | B1 | | 1/2001 | Kim |
| 7,028,679 | B2 | * | 4/2006 | Hillman et al. ............ 123/563 |
| 2007/0051347 | A1 | * | 3/2007 | Thalberg .................. 123/538 |
| 2009/0007878 | A1 | * | 1/2009 | Korenjak et al. .......... 123/193.5 |

FOREIGN PATENT DOCUMENTS

| | | |
|---|---|---|
| WO | 99/23382 A1 | 5/1999 |
| WO | 2005/026521 A1 | 3/2005 |

OTHER PUBLICATIONS

Chinese Search Report from corresponding CN application.

* cited by examiner

TURBOCHARGER FOR A COMBUSTION ENGINE WITH MAGNETS ARRANGED ALONG AN AIR INLET CHANNEL

BACKGROUND OF THE INVENTION

The invention relates to an apparatus for supply of combustion air to a combustion engine via an exhaust inlet to a turbocharger.

In engines in which it is a condition that the turbocharger provides increased power at low rotational speeds, we use a turbocharger with a pressure limiting valve, also known as a "waste gate valve". This turbocharger is larger than actually required for the motor. The turbocharger is dimensioned with an overcapacity and will reach the desired charge pressure already at low rotational speeds. When the engine reaches the upper rotational speeds, the turbocharger provides too much air, and the overpressure becomes too high. The waste gate valve has an air hose which runs from the inlet manifold down to a diaphragm actuator which acts on the valve. When the charge pressure exceeds a predefined value the pressure against the diaphragm becomes so high that it opens the waste gate valve via a bar. The exhaust gas is then led past the turbo charger and out to the exhaust system, thus the pressure increase ceases. As soon as the admission regulator is reduced, the amount of exhaust against the turbine wheel in the turbo charger is reduced, and the air pressure in the inlet manifold is reduced. The waste gate valve will shut, and all the exhaust gas will again pass through the turbo charger.

It is important for a motor with a turbocharger to have an unobstructed air supply and as few obstacles as possible in the exhaust system. The turbo charger decelerates the exhaust gases and works to some degree as a silencer. The turbo charger and its connections to the exhaust system and the air inlet requires particularly good maintenance and inspection. In addition to lubricating the bearings in the turbo charger the oil has an important role to cool the bearing housing. The heat from the turbine housing propagates into the bearings and the lubricating oil. The oil is so strongly heated when the engine runs at high load that all turbo charged engines must be provided with an oil radiator. The engine should moreover have a lubricating oil which is adapted to motors with turbo chargers.

BACKGROUND ART

A turbo charger increases the engine power in that more air is added to the combustion, so as for more fuel to be injected and combusted per work cycle. Suction engines without a turbo charger may use a high proportion up to 10% of their produced energy to suck in air. One of the problems for a diesel engine may be just to have a sufficiently high air supply in the upper rotational speed range. If, in addition, the engine condition is generally poor due to wear in the injection system and a considerable ignition delay, this will often incur sooting. Sooting may often be seen in conjunction with a too high fuel to air ration and exceeds the upper flash point limit for parts of the injected fuel mixture at so-called rich combustion, and one may have incomplete combustion of the fuel. Such an incomplete combustion may also incur an increased carbon monoxide content in the exhaust and is thus poisonous. The invention seeks amongst other things to reduce such sooting.

DISADVANTAGES OF THE KNOWN ART

The turbo charger is driven by the exhaust gases which run out of the engine at high pressure and high temperature. It thus utilizes energy which would otherwise get lost. The turbine runs an air pump which blows air into the air inlet suction (actually air inlet blow) manifold. The capacity of an adapted turbo charger is slightly higher than what is actually required for obtaining a clean combustion with the same fuel injection capacity as a corresponding suction engine. In the upper rotation speed range when the exhaust gases gradually run the exhaust turbine around with great force and speed, more air is pumped into the motor than what it consumes. Sooting in the engine oil damages the oil, which further leads to increased wear and thus reduces the lifetime of the motor. The earlier onset of wear also reduces the engine power. Soot release to the outlet air is highly undesirable, particularly in places where diesel engines must run more or less continually, due to environmental considerations and health regulations, and require frequent cleaning. It is a problem on some petroleum platforms that diesel engines for electricity generators soot to a degree which incur a health problem to the crew. Presently, extensive cleaning of exhaust manifolds are required for keeping the level of sooting sufficiently low. This problem is more heavily expressed when the diesel engine become worn.

The turbo charger does not provide a benefit to all engines. The motor must work at a sufficiently high rotational speed in order to utilize the turbo charger. In excavators and other production machinery running at rather low working rpm, it is anyhow relevant to use magnets at the air inlet.

An actual diesel engine for running an electrical generator may have a 24 liter piston displacement or more and may benefit from using a turbo charger on the arched inlet channel according to the present invention. The actual turbo delivers a large amount of air, about 16 m$^3$/minute at about 1200 rpm for the motor. The diesel motor runs generally an electrical generator which further runs hydraulic systems, thrusters and similarly power demanding equipment on a marine drilling platform, a petroleum production platform, an FPSO vessel, or a similar petroleum installation. The turbo charger according to the invention may also be used on land based plants.

SUMMARY OF THE INVENTION

The invention is a turbo charger (3) driven by exhaust gas from a combustion engine (1) via an exhaust inlet (35) to the turbo charger (3). The turbo charger (3) has an axial inlet (31) for combustion air generally at atmospheric pressure, from an outlet (34) at a bent pipe portion (37) with an inlet (36) from an inlet channel (4) from an air inlet (5). The inlet channel (4) has at least one arched wall (41) of non-magnetic material, with an inner surface (43) and an outer surface (45) relative to the inlet channel (4), wherein along the arched wall (41) is arranged a series of at least three magnets (6) having sequentially opposite magnetisation directions directed mainly orthogonal to said wall (41), and with a pole surface (61) of each magnet (6) generally in level with said wall (41), with a mutual separation between said magnets at least as long as a half of a first width of said inlet channel's cross-section.

ADVANTAGES OF THE INVENTION

An advantage of the invention is that the magnets are arranged along the radially inner part of the air flow in the inlet channel where it is expected that the air will pass with high speed and even air flow. It appears to the applicant that the motor's combustion properties are improved compared to when they are arranged along the opposite, outer wall of the air inlet channel. This allows reducing the rotation speed somewhat without losing power, or the fuel consumption is reduced, while sooting is reduced. The magnets are arranged along the outside surface of the wall of the channel so as for not to extend into the air flow which would reduce the area of the flow cross section. An additional advantage of the invention is that the magnets are arranged with a separation along the channel which allows the magnet's fields to extend into the channel cross section and not being "shorted" over to the adjacent neighbour magnet's oppositely directed magnetic field.

A turbo charger with magnets on an arched wall on the inlet channel to a large diesel engine may thus result in reduced sooting and thus provide reduced maintenance costs, improved health conditions, and slightly reduced noise level and/or improved engine power.

BRIEF FIGURE CAPTIONS

The invention is illustrated in the attached drawings, wherein

Figure 6:
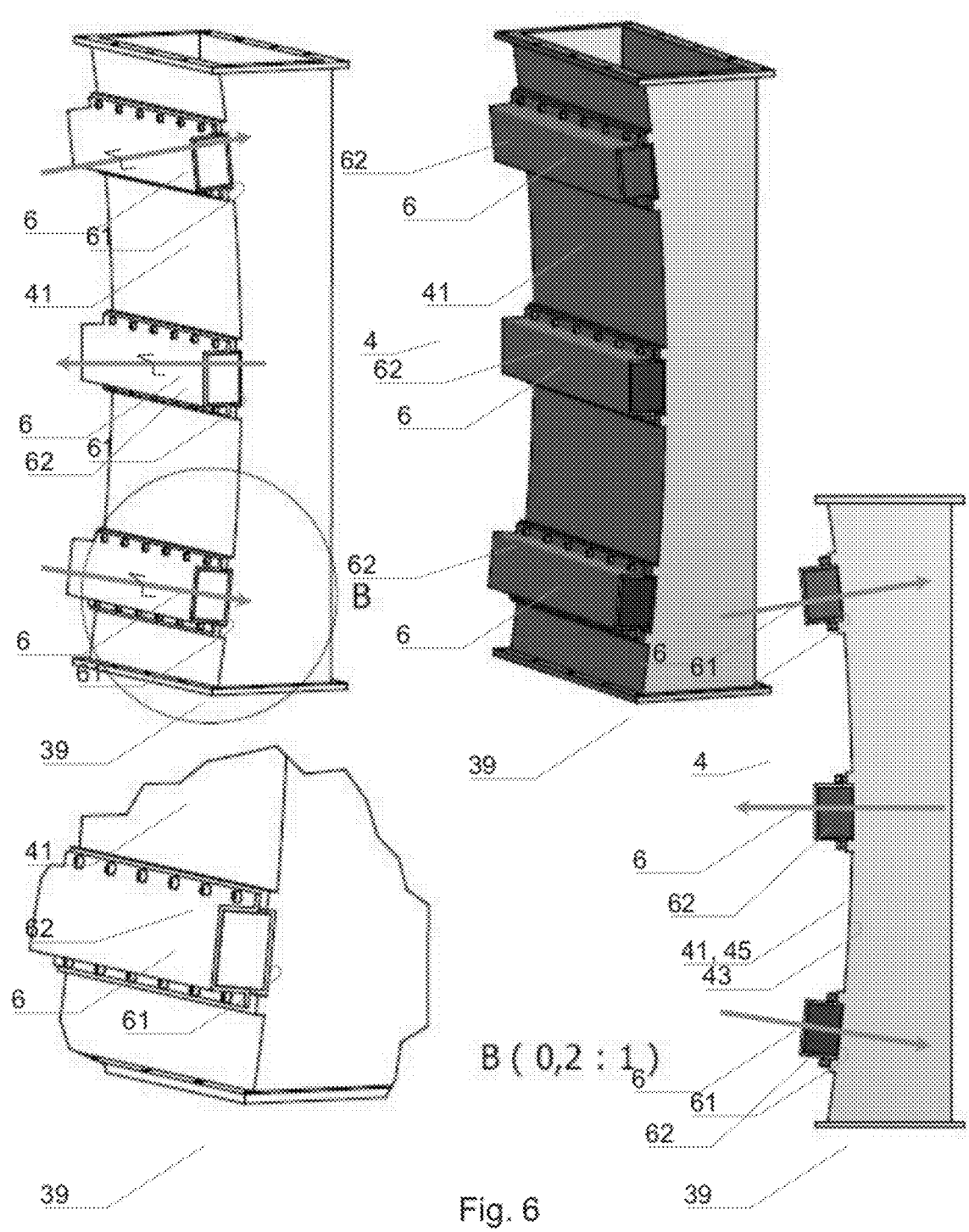

FIG. 6 shows an embodiment of the inlet channel according to the invention wherein the inlet channel has a straight main axis but wherein one of the walls of the inlet channel is arched and has the magnets arranged along the arched wall's inward arched face. The magnets are also here mounted in capsules along the arched wall's short inner path of the inlet channel. To the extreme right it is illustrated how the magnets' magnetic moments are directed generally perpendicularly onto the arched wall, and with the magnetic moment directed alternately opposite, outwards or inwards respectively, through the wall, and that the magnets are arranged with separations larger than at leas a half of a cross-section of the channel.

DESCRIPTION OF EMBODIMENTS OF THE INVENTION

Figure 1:
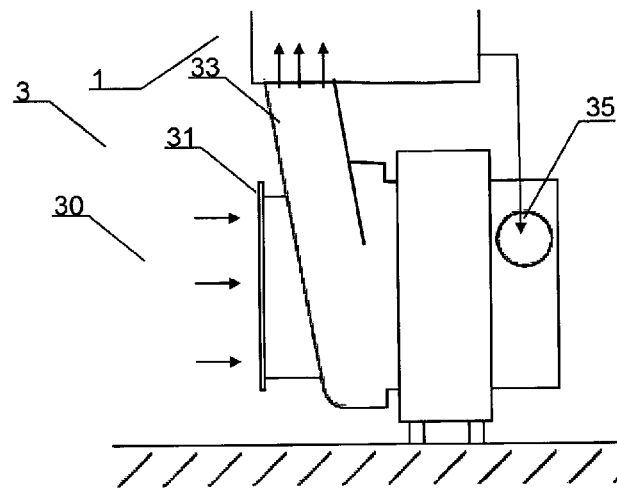
FIG. 1 is a schematic view of a turbo charger driven by exhaust gas from a diesel motor. The turbo charger has an axial inlet for combustion air with a ring shaped flange usually provided with an air filter in the background art, please se FIG. 2 below.
Figure 2:
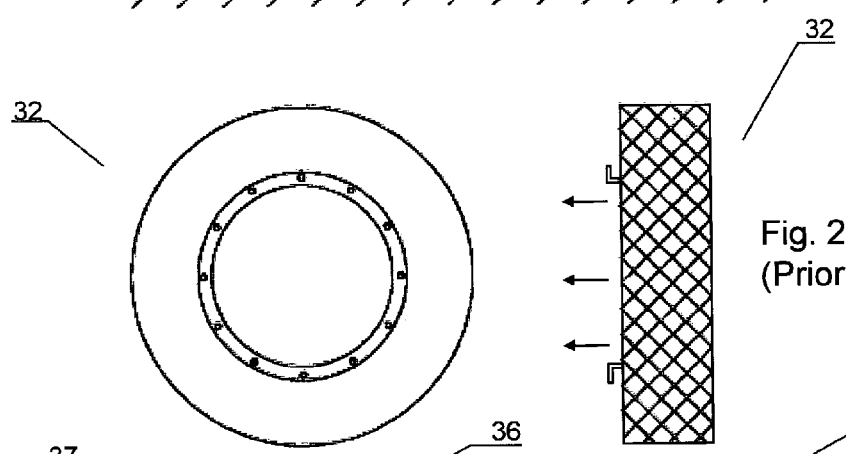
FIG. 2 is an illustration of such an air filter as mentioned above with a grid arranged over a radial inlet (shown to the right in the drawing) and its axial inlet within its' ring shaped flange (shown to the left).
Figure 3:
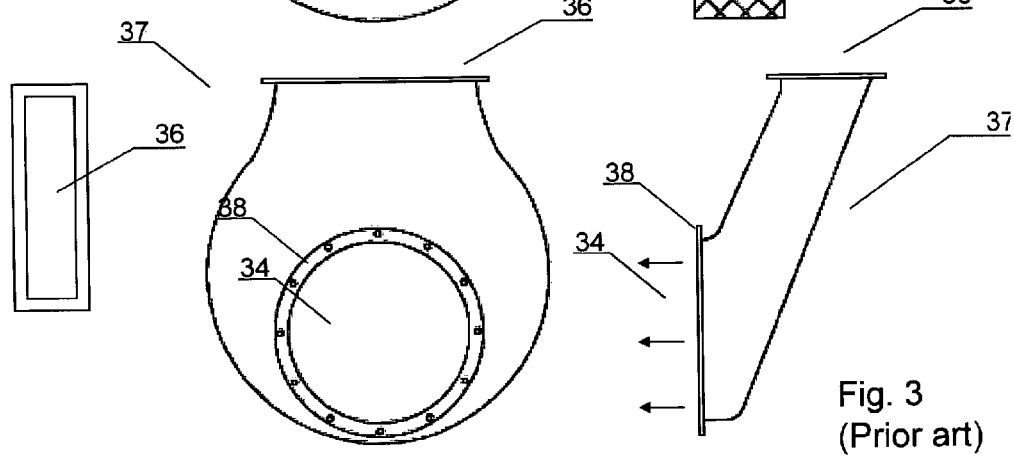
FIG. 3 shows a transition from an external inlet channel for air, with rectangular cross-section at the connection to the transition for axial connection to a turbo charger as shown above. Such an external inlet channel may be from outside an engine room for supply of combustion air to the turbo charger.

The invention described here is a turbo charger (3) driven by exhaust gas from a combustion engine (1) via an exhaust outlet (35) to the turbo charger (3). Such a turbo charger is illustrated in FIG. 1 and belongs to prior art. The turbo charger (3) has an axial inlet (31) for combustion air mainly under atmospheric pressure, from an outlet (34) of a bent pipe portion (37) with an inlet (36) from an inlet channel (4) from an air inlet (5).

Figure 4:
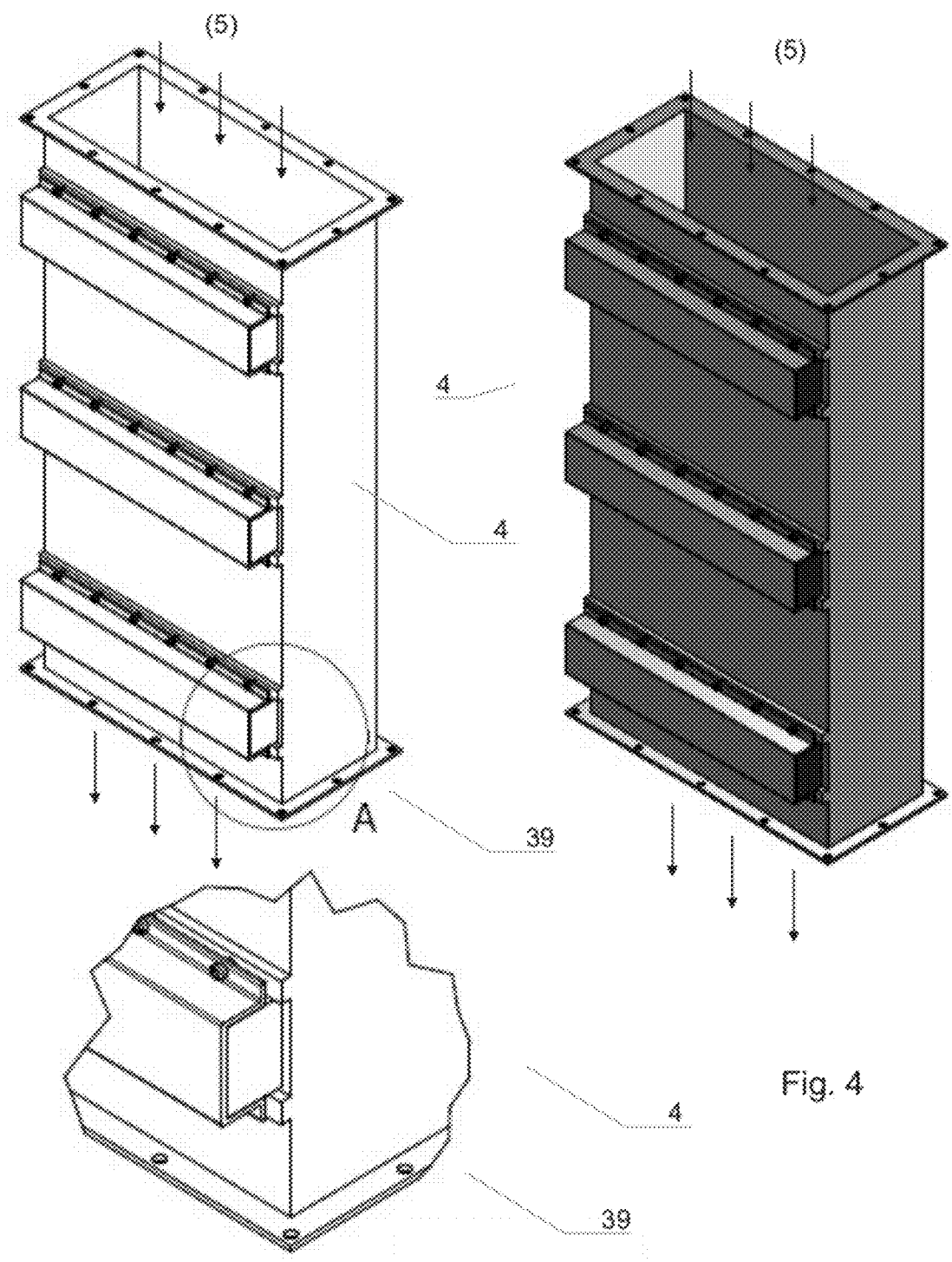
FIG. 4 shows a straight inlet channel with rectangular cross section arranged for connecting to a transition piece as mentioned above under FIG. 3. There are arranged magnets on a wall along the outside of the inlet channel inside relative to the running air path.

The inlet channel's (4) cross-section may be round, weakly elliptic or rectangular, and is often rectangular for large motors, please see FIG. 4. The inlet channel according to a preferred embodiment of the invention has at least one arched wall (41) as counted in the inlet channel's longitudinal section, please see FIG. 5 and FIG. 6. The arched wall (41) is made of weakly magnetisable material such as stainless or acid proof steel or preferably non-magnetisable material such as plastics, aluminium, brass or other non-magnetic materials, with an inner surface (43) and an outward facing surface (45) relative to the inlet channel (4). Along this arched wall (41) which resides along the short, inner path of the inlet channel (4) there is arranged a series of at least three magnets (6) with sequentially opposite directions of magnetisation directed mainly at right angles relative to the arched wall (41) and thus across the inflowing air stream, please see FIG. 5 and FIG. 6. An inward facing pole face (61) of each magnet (6) is flush with the wall (41).

Magnets along an arched surface in the air inlet to the turbo provides reduced sooting from the diesel engine. One possible explanation to the reduced sooting may be that the flow pattern of the inflowing air is slightly changed so as to achieve a slightly improved mixing of air and fuel, but this patent application does not seek any fluid mechanical explanation. The invention results in a small change in the effect curve of the engine, which may also provide a slightly modified way of running and a changed vibration pattern relative to the way it was before the magnets were mounted on the inlet channel. This leads to a slight allowable reduction in the motor's rotational speed while maintaining the torque, alternatively utilising the same rotational speed with a slightly increased power.

Figure 5:
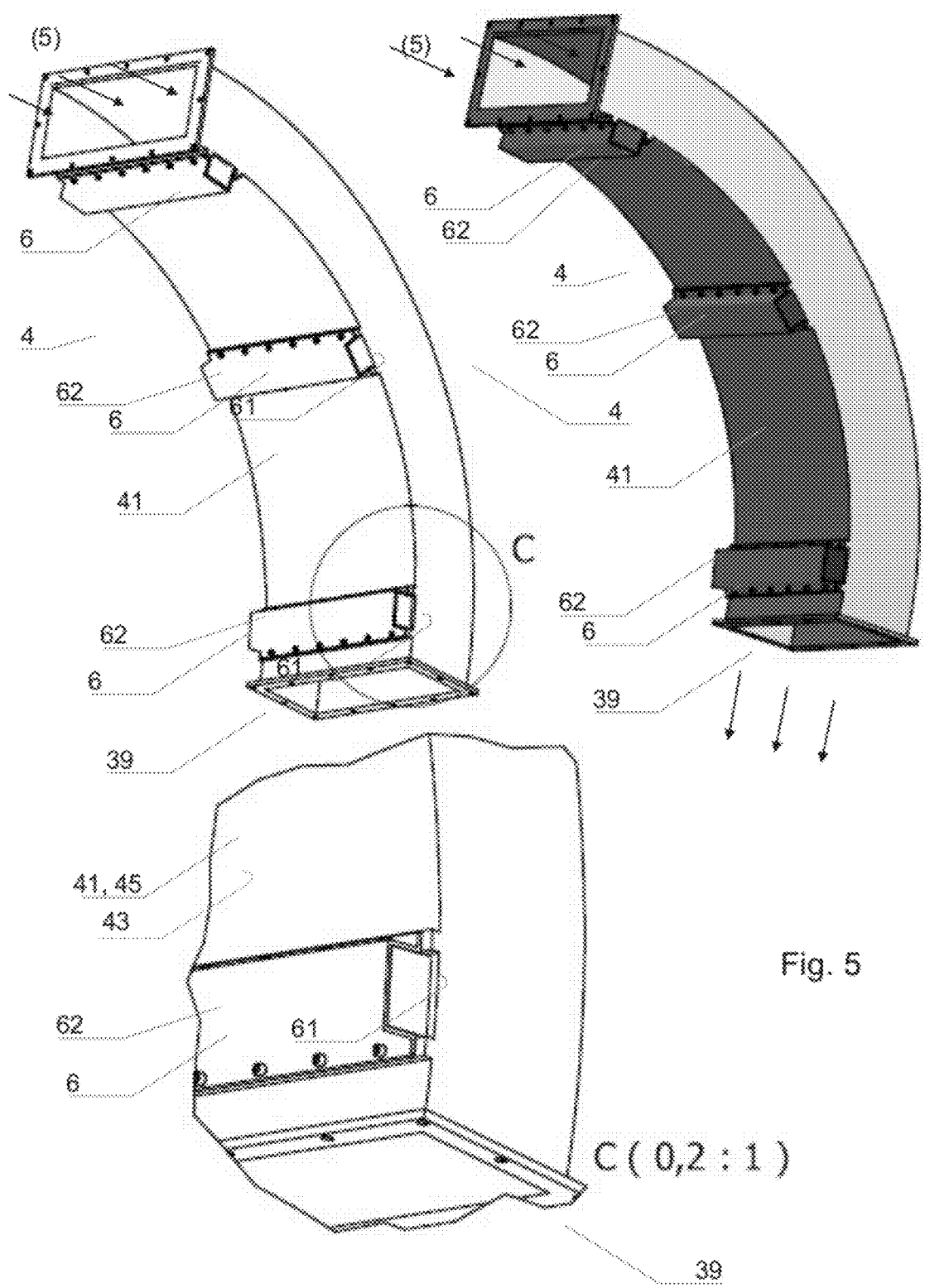
FIG. 5 shows an embodiment of the inlet channel according to the invention wherein the entire inlet channel is arched and has the magnets arranged along the inner, short path of the bend. The magnets are mounted in capsules on the wall along the inner, short path of the bend.

According to a preferred embodiment of the invention each magnet (6) is arranged on the wall's outer surface (45), and with a pole surface (61) of each magnet (6) generally being flush with the wall's (41) inward facing surface (43) without breaking through this. In this way the inward facing surface (43) may be kept slick and turbulence, which would otherwise have been formed, will be avoided, and the magnet's inward directed face will also not prevent the air flow. Each magnet (6) may be arranged in a capsule (62) arranged on the wall's (41) outward facing surface (45). In FIG. 5 is shown that the material cross-section in those parts of the wall which support the flange of the capsule (62) is increased in order to provide a good support for the mounting, please see particularly the cross-section of FIG. 6.

The turbo charger (3) according to the invention is preferably arranged for inlet of mainly atmospheric combustion air. In this way possible waste of energy for membrane filtration or use of separately stored pressurised air.

According to a preferred embodiment of the invention the arched wall (41) constitutes the shorter, inner path of the inlet channel (4). This is illustrated in both FIG. 5 an FIG. 6. In order to let the air continue to run with the radius of curvature to the same direction as in the inlet channel (4), the arched wall (41) is bent to the same lateral direction as for the bent pipe portion (37). In this manner an unnecessary change of rotation direction for the incoming air is avoided.

The arched wall (41) turns with an angle of between 20 degrees and 90 degrees. According to a preferred embodiment it does not turn as much as 90 degrees, but turns with an angle of between 26 degrees and 60 degrees.

There should be a certain separation between the magnets so as for them not to end up to close and thus to a partial degree mutually annul their effect. An internal separation between the magnets should at least be as wide as a half of a first width of the inlet channel as counted at right angles on the wall (41) such as shown in the cross-section in FIG. 6. The separation may also be calculated and adapted based on the flow speed in the channel so as for, if the through flow speed for the air in the channel is high, the magnets may be arranged with a separation which is several times the first width of the channel, and if the flow rate in the channel is low, the magnets may be arranged with a separation which is equal to or less than the first width of the inlet channel, but still more than a half of the width of the inlet channel. The separation between the magnets along the inlet channel may in an embodiment be adjustable. The magnets may according to an embodiment of the invention be mounted on mutually displaceable holders on partially overlapping but air-proof panels. Those panels may be arranged to be displaced along tracks in the direction of the inlet channel in order to adjust the mutual separation between the magnets depending on the air flow speed in the inlet channel. In this way the magnets' separations may be adjusted relative to the air through flow rate or the diesel engine's rotational speed.

The invention claimed is:

1. A turbo charger (3) driven by exhaust gas from a combustion engine (i) via an exhaust inlet (35) to the turbo charger (3) comprising:
said turbo charger (3) having an axial inlet (31) for combustion air generally at atmospheric pressure, the combustion air received from an outlet (34) of a bent pipe portion (37) with an inlet (36), the inlet (36) of the bent pipe portion (37) receiving the combustion air from an inlet channel (4) of an air inlet (5), and
said inlet channel (4) having, in a longitudinal flow direction between an inlet and an outlet of the inlet channel (4), at least one arched wall (41) of non-magnetic material, with an inner surface (43) and an outer surface (45) relative to an exterior of said inlet channel (4), said outer surface (45) of said arched wall (41) being concave when viewed from a center point of a radius of curvature of said outer surface (45), wherein,
a series of at least three magnets (6) are arranged along said arched wall (41) along a portion of a short inner path of the longitudinal flow direction between the inlet and the outlet of the inlet channel (4), the series of at least three magnets (6) arranged having sequentially opposite magnetization directions directed mainly orthogonal to said arched wall (41), and with a pole surface (61) of each magnet (6) generally in level with said arched wall (41), the portion of the short inner path on which said at least three magnets (6) are arranged being concave when viewed from the center point of the radius of curvature of said outer surface (45) in the longitudinal flow direction between a first of the at least three magnets and a last of the at least three magnets, the portion of the short inner path being at an area of increased air flow, and
a mutual separation between said magnets, along the longitudinal flow direction between the inlet and the outlet of the inlet channel (4), being at least as long as a half of a first width of said inlet channel's cross-section.

2. The turbo charger (3) of claim 1, wherein each magnet (6) is mounted on said wall's outer surface (45) and with the pole surface (61) of each magnet (6) being flush with said wall's (41) inner surface (43), and the mutual separation between said magnets, along the longitudinal flow direction between the inlet and the outlet of the inlet channel (4), is half of the first width of said inlet channel's cross-section.

3. The turbo charger (3) of claim 2, wherein each magnet (6) is arranged in a capsule (62) mounted on said wall's (41) outer surface (45).

4. The turbo charger (3) of claim 1, wherein said inlet channel (4) has a rectangular cross-section.

5. The turbo charger (3) of claim 1, wherein said arched wall (41) turns in the same direction as said bent pipe portion (37).

6. The turbo charger (3) of claim 1, wherein said magnets (6) are mounted on mutually displaceable holders arranged for being displaced along tracks in said inlet channel's (4) longitudinal flow direction in order to adjust the mutual separation between said magnets relative to the air flow through speed in said inlet channel.

7. The turbo charger (3) of claim 1, wherein said arched wall (41) turns with an angle of between 20 degrees and 90 degrees.

8. The turbo charger (3) of claim 1, wherein said arched wall (41) turns with an angle of between 26 degrees and 60 degrees.

9. The turbo charger (3) of claim 1, wherein,
each magnet (6) is mounted on the outer surface (45) of said arched wall (41) with the pole surface (61) of each magnet (6) being flush with an inner surface (43) of said arched wall (41).

10. A turbo charger (3) driven by exhaust gas from a combustion engine (i) via an exhaust inlet (35) of the turbo charger (3), said turbo charger (3) comprising:
an axial inlet (31) for receiving combustion air generally at atmospheric pressure;
a bent pipe portion (37) having i) an inlet (36) that receives the combustion air generally at atmospheric pressure and ii) an outlet (34) connected to the axial inlet (31) so that the axial inlet (31) receives the combustion air generally at atmospheric pressure from the outlet (34) of the bent pipe portion (37), the bent pipe portion (37) being bent such that the combustion air runs through the bent pipe portion (37) with a first radius of curvature;
an air inlet (5) providing an arched inlet channel (4) having i) an inlet part that receives the combustion air generally at atmospheric pressure and ii) an outlet part connected to the inlet (36) of the bent pipe portion (37),
said inlet channel (4) being arched such that the combustion air runs through the inlet channel (4) with a second radius of curvature,
said inlet channel (4) having, in a longitudinal flow direction between the inlet part and the outlet part, an arched wall (41), the arched wall (41) having an inner surface (43) and an outer surface (45) relative to said inlet channel (4), the outer surface (45) being concave when viewed from a centerpoint of the second radius of curvature of said inlet channel (4), the arched wall (41) having a width defining a width of the inlet channel (4) and a length in the longitudinal flow direction; and
three magnets (6) arranged on said outer surface (45) of a portion of a short inner path of said arched wall (41) along the longitudinal flow direction of the inlet channel (4), the portion of the short inner path on which said three magnets (6) are arranged being concave when viewed from the center point of the radius of curvature of said outer surface (45) in the longitudinal flow direction between a first of the three magnets and a last of the three magnets, the portion of the short inner path being at an area of increased air flow, the three magnets (6) arranged having sequentially opposite magnetization directions directed mainly orthogonal to said arched wall (41), wherein a mutual separation between each of said magnets, along the longitudinal flow direction of the inlet channel (4), is at least as long as a half of a first width of a cross-section of said inlet (4).

11. The turbo charger (3) of claim 10, wherein,
the arched wall (41) is of non-magnetic material, and each magnet (6) is mounted on said exterior surface (45) of said arched wall (41) with the pole surface (61) of each magnet (6) being flush with the inner surface (43) of said arched wall (41).

12. The turbo charger (3) of claim 11, wherein each magnet (6) is arranged in a capsule (62) mounted on said outer surface (45) of said arched wall (41).

13. The turbo charger (3) of claim 10, wherein said inlet channel (4) has a rectangular cross-section.

14. The turbo charger (3) of claim 10, wherein said inlet channel (4) is arched such that the combustion air runs through the inlet channel (4) with the second radius of curvature such that said arched wall (41) turns in the same direction as said bent pipe portion (37).

15. The turbo charger (3) of claim 10, wherein said magnets (6) are mounted on mutually displaceable holders arranged for being displaced along tracks in said inlet channel's (4) longitudinal flow direction in order to adjust the mutual separation between said magnets.

16. The turbo charger (3) of claim 10, wherein said arched wall (41) turns with an angle of between 20 degrees and 90 degrees.

17. The turbo charger (3) of claim 10, wherein said arched wall (41) turns with an angle of between 26 degrees and 60 degrees.

18. The turbo charger (3) of claim 10, wherein,
each magnet (6) is mounted with the pole surface (61) of each magnet (6) being flush with the interior surface (43) of said arched wall (41).

* * * * *